March 13, 1956    W. D. KIRKPATRICK ET AL    2,737,987
DEVICE FOR BLOWING SAWDUST FROM THE LINE OF CUT OF HAND SAW
Filed April 28, 1953
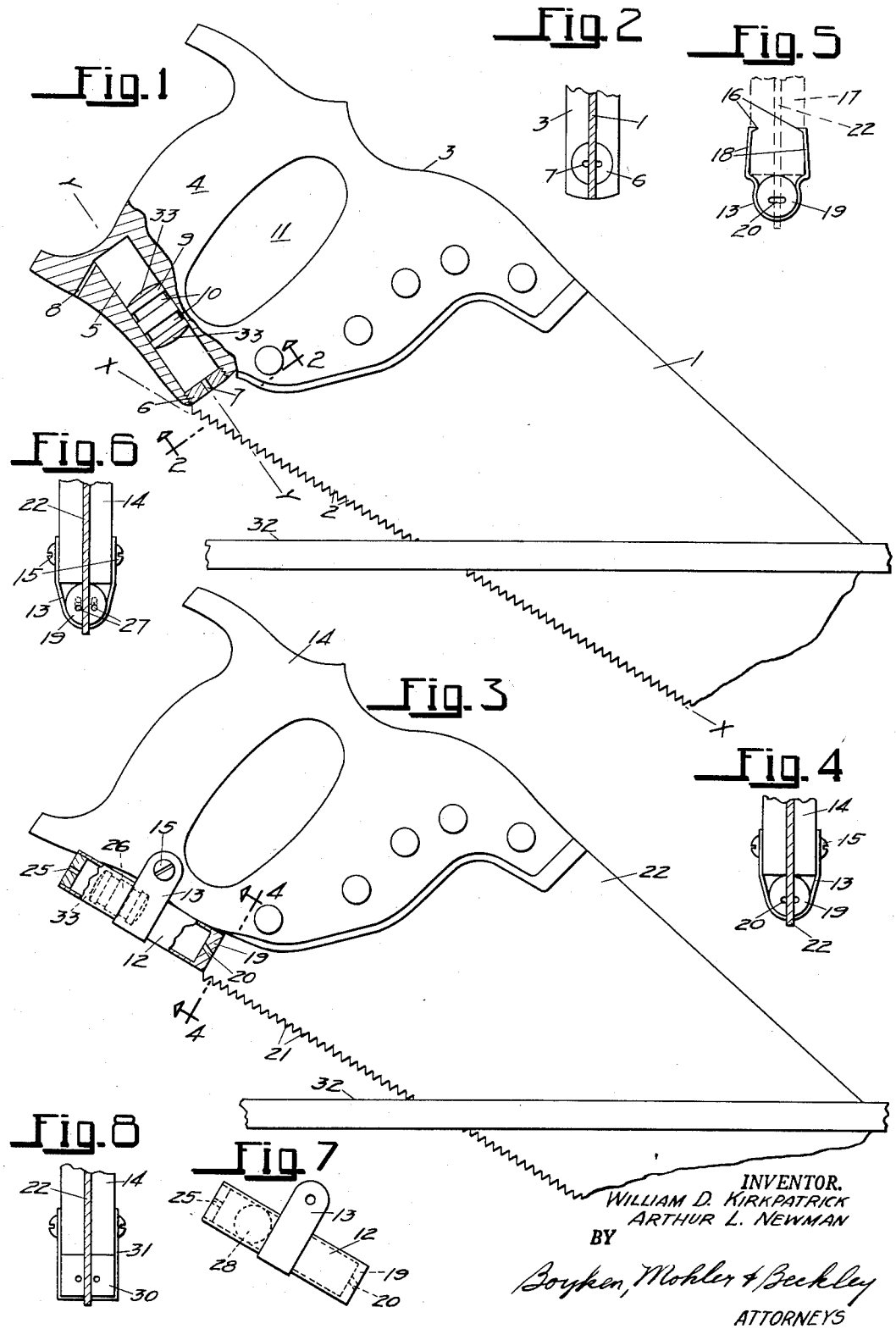
INVENTOR.
WILLIAM D. KIRKPATRICK
ARTHUR L. NEWMAN
BY
Boyken, Mohler & Beckley
ATTORNEYS

United States Patent Office 2,737,987
Patented Mar. 13, 1956

2,737,987

DEVICE FOR BLOWING SAWDUST FROM THE LINE OF CUT OF HAND SAW

William D. Kirkpatrick and Arthur L. Newman, Kelseyville, Calif., assignors of one-third to Benjamin C. Jones, Lakeport, Calif.

Application April 28, 1953, Serial No. 351,652

1 Claim. (Cl. 145—35)

This invention relates to a device for blowing sawdust from the line of cut of a hand saw in a sawing operation and has for one of its objects the provision of a simple, economically made, inconspicuous, inertia actuatable blower for automatically blowing sawdust away from the line along which a hand saw is cutting during a cutting operation.

Another object of the invention is the provision of an inertia actuatable blower adapted to be attached to a handsaw, without modifying the standard saw, in a position in which the blower will clear away sawdust along the line that the saw is cutting during a normal sawing operation so that the operator can clearly see the line to be followed by the saw teeth at all times without stopping or altering the sawing step.

In a normal sawing operation by a hand saw of the usual type having a blade and a handle at one end of said blade, a careful workman usually will draw a line to be followed during the sawing operation. This line is quickly covered with sawdust, and in order to follow the line, the workman must stop frequently to blow away the sawdust. The sawdust produced in sawing plaster board is particularly profuse and obliterating and such material must be cut with a hand saw.

With the present invention, a blower is provided that effects a blowing operation with each reciprocatory movement of the saw, and this blower is actuated solely by inertia and is effective for blowing the sawdust away from both sides of the saw with each stroke and without interference from the set of the teeth.

Other objects and advantages will appear in the description and in the drawings.

In the drawings,

Fig. 1 is an elevational view of the handle and part of the blade of a saw showing one form of the invention.

Fig. 2 is a sectional view taken along line 2—2 of Fig. 1.

Fig. 3 is a view similar to that of Fig. 1, but showing another form of the invention.

Fig. 4 is a sectional view taken along line 4—4 of Fig. 3.

Fig. 5 is a view similar to that of Fig. 4 in which a different actuating means is used for securing the device to a saw. The saw handle and blade are indicated in dash lines.

Fig. 6 is a fragmentary view similar to that of Fig. 4 but showing two separate discharge apertures.

Fig. 7 is an elevational view of a device similar to that of Fig. 4, but separate from a saw, and in which a ball is used instead of a piston.

Fig. 8 is a view similar to that of Fig. 6 in which the tubular blower member is polysided instead of cylindrical.

In detail, the invention as illustrated in the drawings is applicable to a hand saw of the common type in which there is a saw blade 1 having a straight row of teeth 2 along the lower edge when the blade is in a vertical plane and in a normal sawing position. Such blade also has a handle generally designated 3 secured to the rear end thereof and which handle includes a hand grip 4. This hand grip is above the level of the row of teeth 2 and in most saws it is a sufficient distance above said level to enable the present invention to be employed without interfering in any manner with the customary manner in which the saw is used, and without interfering with the normal sawing action of the saw.

The present invention as shown in Fig. 1 comprises the provision of a passageway 5 formed in the handle 3 of the saw at a level above that of the row of teeth 2. This passageway, as seen in Fig. 1 extends generally longitudinally of the row of teeth 2. The said passageway extends slantingly downwardly in direction toward the saw blade so that its longitudinal axis Y—Y is at an angle of between about 25° and 35° relative to the line X—X of the saw teeth.

The lower end of passageway 5 terminates in a head 6 that is substantially against the rear edge of the saw blade 1 and this head may be secured in the passageway in any suitable manner and is formed with a central discharge opening 7 that is horizontally elongated transversely of axis Y—Y so as to be divided by the rear edge of the saw blade into a pair of openings, one at either side of the blade (Fig. 2). Opening 7 is spaced above the level of the row of teeth 2, hence the set of the teeth will not interfere with the blast of air discharged from said opening, and the fact that openings (the ends of opening 7) are at opposite sides of the plane of the saw blade 1 results in the sawdust being blown from both sides of the blade by each blast of air from the blower. The opposite end of the passageway may be ported by an opening 8, and within the passageway is a freely slidably floating piston or member 9 that may be formed with circular radially outwardly opening grooves 10 to reduce friction and to produce a better air seal.

If the handle is formed of plastic material the passageway 5 may be molded into the handle at the time it is made, or it can obviously be formed in any handle having sufficient depth below the hand opening 11.

In the standard handle where there may not be sufficient depth below opening 11 to form the passageway 5, the passageway may be provided by providing an elongated tube 12 (Fig. 3) that has a generally U-shaped piece 13 (Fig. 4) secured thereto. The legs of the U will fit against opposite sides of the saw handle 14 and be secured thereto by screws 15 or, as seen in Fig. 5, the legs of the U-shaped piece may be of spring metal with one or more inwardly directed teeth 16 along the free ends of the legs for biting into the handle 17 (shown in dotted line) with sufficient force to retain the device in place on the saw. The spring legs 18 would, of course, constantly urge the U-shaped piece into gripping relation with the handle. Except for the clamping means the other elements shown in Fig. 5 are the same as shown in Figs. 3 and 4.

The head 19 of the tubular body 12 is formed with a discharge aperture 20 at the end that is adjacent to the saw blade 21 and this aperture differs from the aperture 6 of Figs. 1, 2 in that its sides are not parallel with the axis of the body 1, but they are inclined relative to said axis so as to give the air ejected therefrom the same direction of movement relative to the row of saw teeth 21 on blade 22 as the direction indicated by the axial line Y—Y of Fig. 1. This structure is employed in the present instance because the lower side or edge of the conventional saw handle is not tilted relative to the line of the saw teeth, but is usually about parallel with said line. Obviously where there is room for the tubular member 12 to be tilted and to eject air in the desired direction, the aperture could be as shown in Fig. 1.

The end of the tubular body 12 that is opposite the aperture 20 may be formed with an opening 25 thus venting body at opposite ends.

Piston 26, similar to piston 9, is reciprocably supported within the body 12.

In Fig. 6, the structure is the same as in Fig. 4 except that two horizontally spaced discharge apertures 27 are provided instead of only one. Thus one aperture will be at each of the sides of the saw blade which is the equivalent of the aperture 7 of Figs. 1, 2 and the aperture 20 of Fig. 4.

In Fig. 7, the piston 28 is in the form of a metal ball instead of being cylindrical. Otherwise the structure is the same as in Figs. 3 and 4. This has the advantage of not being affected by oil or the like. The pistons 9, 26 in the devices of Figs. 1, 3 are more efficient for producing a flow of air, but any oil in the tubular member greatly reduces their efficiency to a point below the efficiency of the ball of Fig. 7.

In Fig. 8, the tubular member 30 is rectangular in cross sectional contour. Thus square tubing can be used provided the piston is of similar cross-sectional contour. The body 30 can be secured to the handle by a U-shaped member 31 in the same ways as already described.

In operation, reciprocable movement of the saw in the usual sawing operation results in the piston or ball within the tubular body becoming an inertia actuated member. Of course, there is also the influence of gravity on the piston or ball. At the end of the down stroke, a jet of air is produced sufficient to blow sawdust away from the line to be followed by the saw, thus keeping the line absolutely clear of sawdust. The angle of the discharge aperture or the angle of the tubular body may be made to eject the air to exactly the right place on the material being sawed according to any peculiarities in the angle at which the operator holds the saw. One operator may tend to hold the saw at an angle of say 30 degrees relative to the board or material being sawed, the surface of such material being indicated at 32 in Fig. 1, while another may hold the saw at say more of a 45° angle. Such variations will not materially affect the operation of the device, but if the saw is held at almost a 90° angle to the work, then perhaps the air should be ejected from the blower almost parallel with the row of teeth. It is so seldom that a saw is held in the last mentioned position that, for practical purposes, it may be virtually ignored.

The pistons in the tubular members, whether of the ball or cylindrical type, need not be closely fitted within the tubular members. They may be fairly loose so as to be freely movable in the tubular members.

Cushions 33 of rubber or the like may be secured to opposite ends of pistons 9, 26 (Figs. 1, 3) to negative any shock which said pistons might otherwise transmit to the closed ends of tubes 5, 12 during the reciprocation of pistons 9, 26.

While an elongated opening 20 or a pair of openings 27, as described, insure against possible complete stoppage of the discharge outlet, only one opening 7 would be adequate and it could be at one side or the other of the blade. The air striking the material being sawed would spread and clear away the sawdust.

We claim:

In a hand saw provided with a saw blade having a forward and a rear end and including a row of teeth along the lower edge of such blade extending between such ends when said blade is in a vertical plane in sawing position, and a handle secured to said rear end having a hand grip for engagement by the hand of the user; an inertia actuatable blower secured to said saw below said grip and adjacent the rear end of said blade and at a level above that of the level of said row of teeth, said blower being provided with a passageway extending generally longitudinally of said row and having an outlet opening adjacent to the rear end of said blade spaced above said level and at each of the opposite sides of the plane of said blade, each of said openings being directed along the side of the blade adjacent thereto and generally downwardly and toward the forward end of said blade for discharge of air from within said passageway toward the surface of material being cut by said teeth at a point adjacent to the cutting teeth that are effective for cutting said material during a cutting operation, and a member floatingly enclosed within said passageway for reciprocable movement toward and away from said discharge opening upon reciprocable movement of said saw in a sawing operation for causing said discharge of air.

References Cited in the file of this patent

UNITED STATES PATENTS

| Number | Name | Date |
|---|---|---|
| 648,511 | Lyons | May 1, 1900 |
| 671,488 | Michalscheck | Apr. 9, 1901 |
| 1,036,810 | Dufault | Aug. 27, 1912 |
| 1,234,432 | Whitworth | July 24, 1917 |
| 2,440,855 | Goss | May 4, 1948 |